United States Patent Office 2,946,654
Patented July 26, 1960

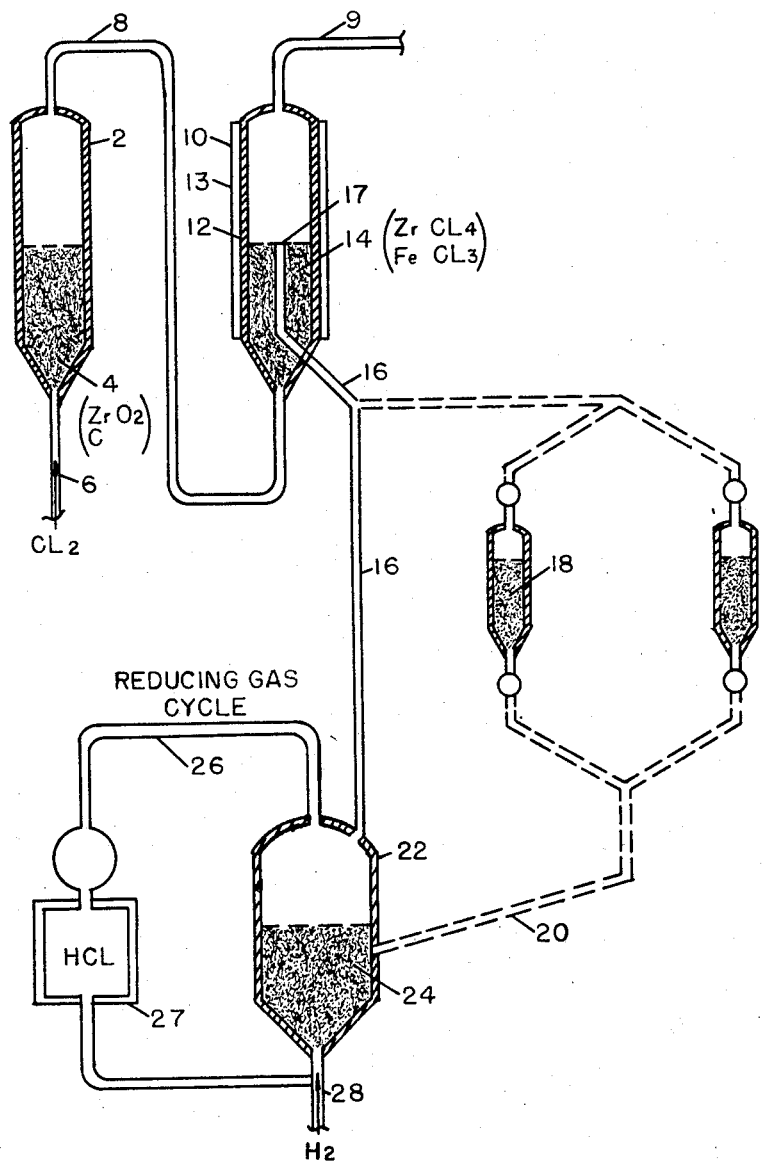

2,946,654
PRODUCTION OF IRON-FREE ZIRCONIUM TETRACHLORIDE

Milo P. Hnilicka, Jr., Concord, Mass., assignor to National Research Corporation, Cambridge, Mass., a corporation of Massachusetts Filed Dec. 27, 1956, Ser. No. 630,969

2 Claims. (Cl. 23—87)

The present invention relates to the production and purification of a sublimable material and specifically to the production and purification of zirconium tetrachloride suitable for nuclear power applications from raw material containing zirconium dioxide and some iron.

Prior art methods have sought to produce iron-free zirconium tetrachloride by a variety of different procedures, including the separation of ferric chloride and zirconium tetrachloride by fractional distillation, by condensation and filtration of the ferric chloride, and by numerous other techniques. All these prior art methods of purification, however, have involved rather serious disadvantages: The close relationship of the boiling point of the ferric chloride and sublimation point of the zirconium tetrachloride makes effective separation of the two chlorides by distillation almost impossible. Also conventional methods for condensing ferric chloride at lower temperatures almost invariably result in the rapid plugging up of conduits and the coating of cooling surfaces by the condensed ferric chloride, thereby requiring dismantling and cleansing of the entire condensation apparatus. In the instant invention, the problems and disadvantages evidenced in the prior art have been either successfully solved or circumvented.

Therefore, it is a prime object of the present invention to provide an improved process for the production and purification of zirconium tetrachloride from zirconium dioxide contaminated with iron.

It is a further object of the invention to provide a process for the condensation of gaseous, ferric chloride-containing, zirconium tetrachloride at a high temperature thereby making possible further treatment of the zirconium tetrachloride without the necessity of reheating.

Other objects of the invention will in part be obvious and will in part appear hereinafter.

The invention accordingly comprises the process involving the several steps and the relation and the order of one or more of such steps with respect to each of the others and the product possessing the features, properties and relation of components which are exemplified in the following detailed disclosure, and the scope of the application of which will be indicated in the claims.

For a fuller understanding of the nature and the objects of the invention, reference should be had to the following detailed description taken in connection with the accompanying drawing wherein the figure is a diagrammatic, schematic illustration of one embodiment of the invention.

In the present invention, zirconium dioxide containing iron as an impurity is reacted in a fluidized bed reaction chamber with chlorine. The gaseous zirconium tetrachloride and ferric chloride formed are then cooled in a fluidized bed condenser, containing fluidized zirconium tetrachloride, to a temperature slightly below the sublimation temperature of the zirconium tetrachloride and the boiling point of the ferric chloride. Subsequently, the fluidized solids formed are transferred without further cooling into a third fluidized zone wherein they are treated with hydrogen in order to reduce the ferric chloride (B.P. 319° C.) to the higher boiling ferrous chloride (B.P. 1026° C.). Since the boiling point (331° C.) of zirconium tetrachloride is substantially lower then the boiling point of the ferrous chloride, it is now possible to produce an effective separation of the zirconium tetrachloride and the contained iron impurity, present as ferrous chloride, by distillation.

Consequently, the instant process represents two major improvements over prior art processes: Firstly, by condensing the gaseous zirconium tetrachloride and ferric chloride emanating from the chlorinator in a fluidized bed condenser and transferring the fluidized solids to another fluidized zone for subsequent treatment while allowing substantially no further cooling of the solids, I eliminate the necessity for subsequently reheating the solids obtained to a fluidized condition. This reheating would be necessary in subsequent steps if conventional low temperature condensing means were utilized; and since zirconium tetrachloride in newly condensed form is an excellent insulator of heat, this reheating requirement would be both difficult and expensive.

Secondly, an effective separation of zirconium tetrachloride from any iron impurities is finally possible. The difference between the boiling points of zirconium tetrachloride and ferrous chloride is such as to allow for excellent separation by conventional distillation techniques. The zirconium tetrachloride can easily be distilled off, leaving behind substantially all the ferrous chloride.

Referring now to the figure, there is illustrated one preferred embodiment of the invention wherein zirconium tetrachloride and ferric chloride are produced in chlorinator 2 from carbon and zirconium dioxide containing some iron. Chlorine is fed into the fluidized bed 4 by means of conduit 6. The gaseous zirconium tetrachloride and ferric chloride produced are transferred by means of conduit means 8 to a fluidized bed condenser 10 wherein the gaseous products from the chlorinator are cooled to a temperature slightly below their sublimation temperatures by heat transfer to the walls 13 of the condenser 10 which are cooled by means of the cooling jacket 12. Any small amounts of zirconium tetrachloride and ferric chloride which fail to condense in the fluidized bed together with any carbon dioxide present, are removed from the condenser 10 by means of conduit 9. When the level of the fluidized mass 14 in the condenser 10 reaches the height of the opening 17 in conduit 16, the fluidized mass flows by means of the conduit 16 into a third fluidized zone 22 wherein it is treated with hydrogen which is fed into the fluidized mass by means of conduit 28. Any hydrogen which fails to react with the fluidized mass, together with the hydrogen chloride formed, is removed from zone 22 by means of conduit 26. The hydrogen chloride is separated from the unreacted hydrogen by any appropriate means, such as a scrubber means 27, and the separated hydrogen, after having been cooled by any well-known means such as a countercurrent heat exchanger is recycled back for another pass through the fluidized bed.

In a typical run, carbon and zirconium dioxide, containing some iron, are placed in the fluidized-bed chlorinator 2 wherein the temperature is maintained at about 750° C. Chlorine preheated to a temperature of about 100–300° C. is then passed into the chlorinator and through the fluidized mass 4 by means of conduit 6 at a near stoichiometric rate. Gaseous zirconium tetrachloride, containing ferric chloride formed, is transferred by means of conduit 8 into the fluidized bed condenser 10, the walls of which are maintained at a temperature of about 250° C. The condensate (zirconium tetrachloride and ferric chloride) in the form of fluidized solids is transferred by means of conduit 16 to a third fluidized zone 22 maintained at a temperature of about 270° C. Preheated hydrogen at a temperature of about 300° C. is passed through zone 22 at a rate necessary to maintain the fluidized condition of the bed in order to reduce the ferric chloride to ferrous chloride. The zirconium tetrachloride, however, remains unaffected by the hydrogen reducing gas. The hydrogen and hydrogen chloride are removed from zone 22 by means of conduit 26. After separation from the hydrogen chloride, the hydrogen is cooled and is recycled into zone 22 for another pass through the fluidized mass 14.

The zirconium tetrachloride and the ferrous chloride formed can be easily separated by conventional distillation techniques, thereby yielding substantially iron-free zirconium tetrachloride; alternatively, because these impurities are not volatile, they can be allowed to remain as ash in the tetrachloride feed metallothermic reduction.

It should be pointed out that the various zones and conduits containing fluidized material are preferably insulated to prevent excessive heat losses.

In one embodiment of the invention, insulated and heated storage tanks 18 (shown in dotted lines) are utilized for the temporary storage of the fluidized solids 14 emanating from the fluidized bed condenser 10. When it is desired to continue with the process, the fluidized solids can be transferred from the storage tanks 18 to the fluidized reduction zone 22 by means of conduit 20.

Since certain changes may be made in the above process without departing from the scope of the invention herein contained, it is intended that all matters contained in the above description shall be interpreted as illustrative and not in a limiting sense.

What is claimed is:

1. A process for the production and purification of zirconium tetrachloride from iron-containing zirconium oxide which comprises reacting the zirconium oxide with chlorine in a fluidized bed reactor, condensing the gaseous zirconium tetrachloride and ferric chloride produced in a fluid bed condenser, transferring said hot fluidized zirconium tetrachloride and ferric chloride without substantial cooling to a third fluidized zone, wherein the hot ferric chloride-containing zirconium tetrachloride is treated with hydrogen thereby reducing said contained ferric chloride to ferrous chloride but leaving said zirconium tetrachloride substantially unaffected, said zirconium tetrachloride being maintained during treatment with hydrogen at a temperature below the sublimation temperature thereof and thereafter separating the low boiling zirconium tetrachloride from the higher boiling ferrous chloride.

2. A process for the production and purification of zirconium tetrachloride from iron-containing zirconium oxide which comprises reacting the zirconium oxide with chlorine in a fluidized bed reactor, condensing the gaseous zirconium tetrachloride and ferric chloride produced in a fluid bed condenser, transferring said hot fluidized zirconium tetrachloride and ferric chloride without substantial cooling to a third fluidized zone, wherein the hot ferric chloride-containing zirconium tetrachloride is treated with hydrogen thereby reducing said contained ferric chloride to ferrous chloride but leaving said zirconium tetrachloride substantially unaffected, said zirconium tetrachloride being maintained during treatment with hydrogen at a temperature below the sublimation temperature thereof and thereafter distilling off said zirconium tetrachloride, thereby leaving behind the higher boiling ferrous chloride.

References Cited in the file of this patent

UNITED STATES PATENTS

| 2,580,635 | Winter | Jan. 1, 1952 |
| 2,618,531 | Lindblad et al. | Nov. 18, 1952 |

FOREIGN PATENTS

| 487,834 | Great Britain | June 22, 1938 |
| 660,397 | Great Britain | Nov. 7, 1951 |

OTHER REFERENCES

Bureau of Mines Report of Investigations 4915 "High-Temperature Experiments with Zirconium and Zirconium Compounds," U.S. Dept. of the Interior, November 1952, pp. 2, 3.